(12) United States Patent
Wingroe et al.

(10) Patent No.: US 11,923,679 B2
(45) Date of Patent: *Mar. 5, 2024

(54) POWER MANAGEMENT FOR NETWORK DEVICE LINE MODULES

(71) Applicant: Ciena Corporation, Hanover, MD (US)

(72) Inventors: Michael J. Wingroe, Kanata (CA); Matthew William Connolly, Canton, GA (US)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,480

(22) Filed: Dec. 27, 2022

(65) Prior Publication Data

US 2023/0216293 A1 Jul. 6, 2023

Related U.S. Application Data

(63) Continuation of application No. 16/707,824, filed on Dec. 9, 2019, now Pat. No. 11,539,208, which is a
(Continued)

(51) Int. Cl.
| | | |
|---|---|---|
| *H02J 1/10* | (2006.01) | |
| *G06F 1/26* | (2006.01) | |
| *G06F 1/28* | (2006.01) | |
| *G06F 1/32* | (2019.01) | |
| *G06F 1/3296* | (2019.01) | |
| *H02J 1/14* | (2006.01) | |
| *H02J 7/00* | (2006.01) | |
| *H02J 9/06* | (2006.01) | |
| *H02J 13/00* | (2006.01) | |
| *H04W 52/02* | (2009.01) | |

(52) U.S. Cl.
CPC .............. *H02J 1/10* (2013.01); *G06F 1/3296* (2013.01); *H02J 1/14* (2013.01); *H02J 7/0013* (2013.01); *H02J 7/00304* (2020.01); *H02J 7/00308* (2020.01); *H02J 7/0047* (2013.01); *H02J 9/06* (2013.01); *H02J 9/061* (2013.01); *H02J 13/00002* (2020.01); *H04W 52/0235* (2013.01); *G06F 1/26* (2013.01); *G06F 1/28* (2013.01); *G06F 1/32* (2013.01)

(58) Field of Classification Search
CPC ...... H02J 1/10; H02J 7/00308; H02J 7/00304; H02J 13/00002; H02J 1/14; H02J 7/0013; H02J 7/0047; H02J 9/06; H02J 9/061; H02J 13/0096; H02J 13/0003; H04W 52/0235; G06F 1/3296; G06F 1/26; G06F 1/28; G06F 1/32
USPC .......................................................... 713/300
See application file for complete search history.

(56) References Cited

U.S. PATENT DOCUMENTS 6,211,681 B1 4/2001 Kagawa et al.
9,690,346 B1 6/2017 Bucher, II
(Continued)

*Primary Examiner* — Ji H Bae
(74) *Attorney, Agent, or Firm* — Baratta Law PLLC; Lawrence A. Baratta, Jr.

(57) ABSTRACT

A line module for use in a network device a plurality of circuits; and a power module comprising at least one circuit, wherein the power module is connected to the plurality of circuits and a Power Distribution Unit (PDU), and the at least one circuit of the power module is configured to shut down one or more of the plurality of circuits until a current threshold is no longer exceeded by a current drawn from a power feed connected to the first PDU.

18 Claims, 4 Drawing Sheets

Related U.S. Application Data continuation of application No. 15/582,123, filed on Apr. 28, 2017, now Pat. No. 10,505,391.

(56) References Cited

U.S. PATENT DOCUMENTS

| | | | |
|---|---|---|---|
| 2007/0096562 A1* | 5/2007 | Bainbridge | G06F 1/26 307/35 |
| 2010/0037070 A1* | 2/2010 | Brumley | G06F 1/26 713/300 |
| 2011/0245988 A1* | 10/2011 | Ingels | G06F 1/26 700/295 |
| 2014/0164813 A1 | 6/2014 | Alshinnawi et al. | |
| 2017/0346275 A1 | 11/2017 | Zhang et al. | |
| 2018/0275284 A1* | 9/2018 | Sun | G01S 5/0236 |

* cited by examiner

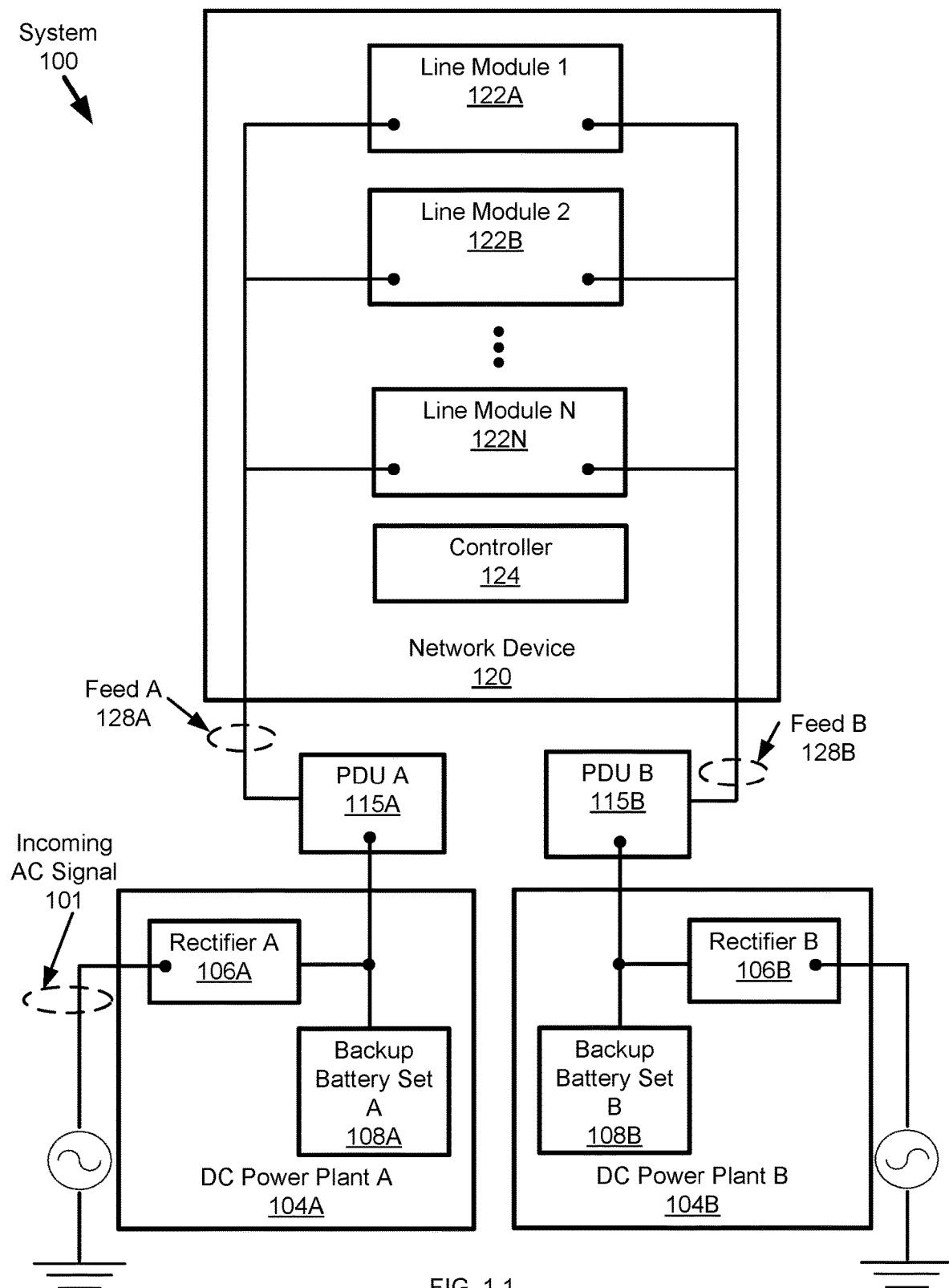
FIG. 1.1

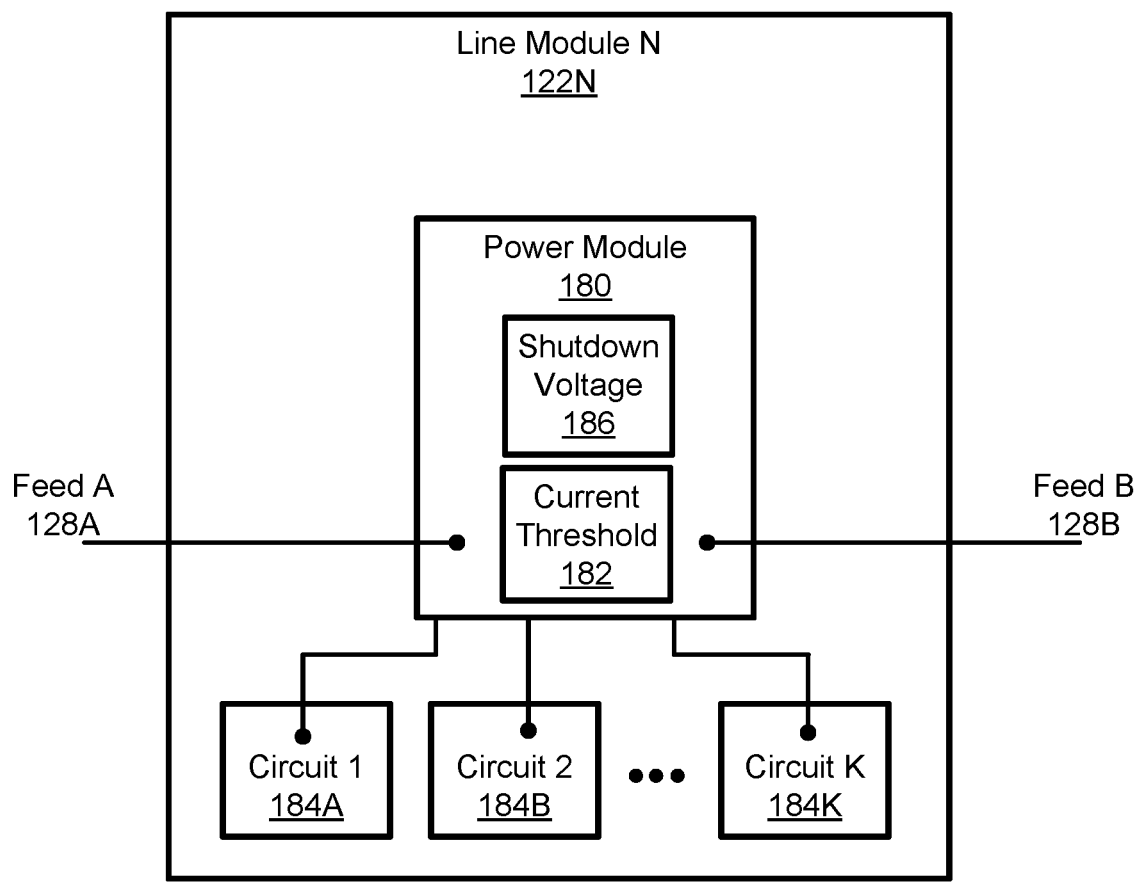
FIG. 1.2

POWER MANAGEMENT FOR NETWORK DEVICE LINE MODULES

CROSS-REFERENCE

The present disclosure is a continuation of U.S. patent application Ser. No. U.S.16/707,824, filed Dec. 9, 2019, which is a continuation of U.S. patent application Ser. No. 15/582,123, filed Apr. 28, 2017, and now U.S. Pat. No. 10,505,391, issued Dec. 10, 2019, the contents of each are incorporated herein by reference.

BACKGROUND

Network devices require electrical power to operate. The power systems and distribution systems that provide electrical power to the network devices are engineered to be highly reliable. However, once the power systems and distribution systems are installed, it can be expensive and difficult to modify them to accommodate networks devices with different (i.e., higher) power requirements.

SUMMARY

In general, in one aspect, the invention relates to a method for power management. The method comprises: determining, by a network device, a maximum current rating of a first power distribution unit (PDU), wherein the first PDU is driven by a first direct current (DC) power plant comprising a set of backup batteries; determining a plurality of power ratings for a plurality of line modules in the network device, wherein the plurality of line modules comprises a first line module and a second line module, and wherein the plurality of line modules are connected to a first feed from the first PDU and a second feed from a second PDU; calculating, by the network device, a maximum aggregate current for the plurality of line modules based on the plurality of power ratings and a shutdown voltage corresponding to the set of backup batteries; and allocating, in response to the maximum aggregate current exceeding the maximum current rating, a first current threshold to the first line module and a second current threshold to the second line module.

In general, in one aspect, the invention relates to a system for power management. The system comprises a controller comprising circuitry configured to: determine a maximum current rating of a first power distribution unit (PDU), wherein the first PDU is driven by a first direct current (DC) power plant comprising a set of backup batteries; determine a plurality of power ratings for a plurality of line modules in a network device, wherein the plurality of line modules are connected to a first feed from the first PDU and a second feed from a second PDU; calculate a maximum aggregate current for the plurality of line modules based on the plurality of power ratings and a shutdown voltage corresponding to the set of backup batteries, and allocate, in response to the maximum aggregate current exceeding the maximum current rating, a plurality of current thresholds to the plurality of line modules.

In general, in one aspect, the invention relates to a non-transitory computer readable medium (CRM) storing instructions for power management. The instructions comprise functionality to: determine a maximum current rating of a first power distribution unit (PDU), wherein the first PDU is driven by a first direct current (DC) power plant comprising a set of backup batteries; determine a plurality of power ratings for a plurality of line modules in a network device, wherein the plurality of line modules comprises a first line module and a second line module, and wherein the plurality of line modules are connected to a first feed from the first PDU and a second feed from a second PDU; calculate a maximum aggregate current for the plurality of line modules based on the plurality of power ratings and a shutdown voltage corresponding to the set of backup batteries; and allocate, in response to the maximum aggregate current exceeding the maximum current rating, a first current threshold to the first line module and a second current threshold to the second line module.

Other aspects of the invention will be apparent from the following description and the appended claims.

BRIEF DESCRIPTION OF DRAWINGS

FIG. 1.1 shows a system in accordance with one or more embodiments of the invention.

FIG. 1.2 shows a line module in accordance with one or more embodiments of the invention.

DETAILED DESCRIPTION

Figure 2:
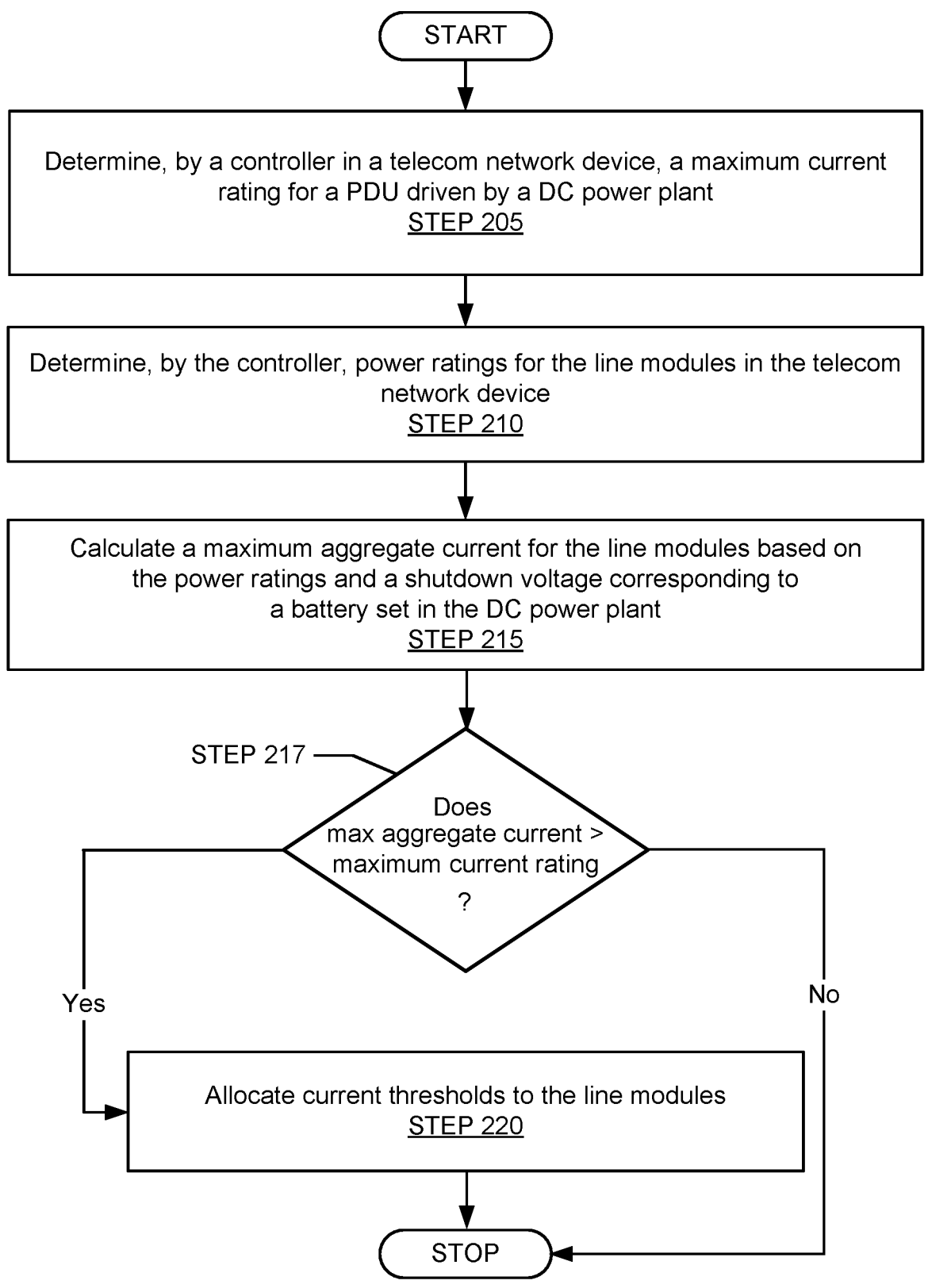
FIG. 2 and FIG. 3 show flowcharts in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, one or more embodiments of the invention provide for a method, a system, and a non-transitory computer readable medium (CRM) for power management. The line modules of a network device are powered by multiple (e.g., dual) feeds, and each feed is connected to its own power distribution unit (PDU) having a maximum current rating (e.g., 60 A). It is determined, by a controller of the network device, whether the multiple line modules would draw more current than the maximum current rating when: (i) only one feed is active and the network device is operating in a high ambient temperature; (ii) the DC power plant driving the one active feed is operating under a set of backup batteries; and (iii) the set of backup batteries are at or are approaching a shutdown voltage. If this is determined to be true, the controller allocates current thresholds to the line modules.

During operation, a line module may initiate a shutdown procedure if the line module is drawing a current, from either feed, that satisfies (i.e., equals or exceeds) its allocated current threshold. With the line modules following this protocol, electrical current in excess of the maximum current rating may be prevented from being drawn from the feed. This in turn reduces the risk of the fuses in the PDU blowing and/or the circuit breaker(s) in the PDU tripping, allowing for a quicker reset once the DC power plant is returned to normal operations. Moreover, line modules with large current requirements may be powered by existing power plants and existing power distribution systems designed for line modules with smaller current requirements, with little loss in reliability.

FIG. 1.1 shows a system (100) for power management in accordance with one or more embodiments of the invention. As shown in FIG. 1.1, the system (100) includes dual direct current (DC) power plants (i.e., DC Power Plant A (104A), DC Power Plant B (104B)), multiple power distribution units (PDUs) (i.e., PDU A (115A), PDU (115B)), and a network device (120). The network device (120), the PDUs (115A, 115B), and the DC power plants (104A, 104B) may all be located at the same location (e.g., warehouse, building, office, floor, etc.). The DC power plants (104A, 104B) may be separated by a firewall. Additionally or alternatively, the DC power plants (104A, 104B) are kept as far apart as possible at the location.

In one or more embodiments of the invention, each DC power plant (104A, 104B) includes a rectifier (i.e., Rectifier A (106A), Rectifier B (106B)) and a set of backup batteries (i.e., Backup Battery Set A (108A), Backup Battery Set B (108B)). During normal operation, the rectifiers (106A, 106B) convert one or more incoming AC signals (e.g., incoming AC signal (101)) into DC signals that drive the PDUs (115A, 115B). While driving the PDUs (115A, 115B), the rectifiers (106A, 106B) also charge the backup battery sets (108A, 108B) and/or apply a float voltage to the backup battery sets (108A, 108B), which prevents current from being drawn from the backup battery sets (108A, 108B). The float voltage may be, for example, 53V.

In one or more embodiments of the invention, the incoming AC signal (101) and/or rectifier A (106A) are vulnerable to failure (e.g., a power failure, a defective rectifier, etc.), at which point the incoming AC signal (101) and rectifier A (106A) cannot be used to produce a DC signal. The same is true for rectifier B (106B). In the event the incoming AC signal (101) fails and/or rectifier A (106A) fails, backup battery set A (108A) may provide the DC signal to drive PDU A (115A). Backup battery set A (104A) is designed to provide an approximately constant voltage (e.g., 48V) for the majority (e.g., 80%) of its reserve time. However, towards the end of its reserve time (e.g., last 20%), the voltage provided by backup battery set A (104A) may decline sharply. The same is true for battery set B (108B).

In one or more embodiments of the invention, use of backup battery set A (104A) should be terminated if backup battery set A's voltage equals or approximately equals a shutdown voltage. For example, the shutdown voltage may be 42V. Continued use of backup battery set A (104A) may result in damage to backup battery set A (108A) and make it difficult, if not impossible, to recharge backup battery set A (108A) in the future. The same may be true for backup battery set B (108B)

In one or more embodiments, the PDUs (115A, 115B) are driven by the DC power plants (104A, 104B), and provide feeds (i.e., Feed A (128A), Feed B (128B)) to power the network device (120). As shown in FIG. 1.1, PDU A (115A) is driven by DC power plant A (104A) and provides feed A (128A). As also shown in FIG. 1.1, PDU B (115B) is driven by DC power plant B (104B) and provides feed B (128B). In one or more embodiments of the invention, the PDUs (115A, 115B) execute filtering operations to improve the quality of the DC power on the feeds (128A, 128).

In one or more embodiments, each PDU (115A, 115B) has a maximum current rating. For example, the maximum current rating may be 60 A, 85 A, 100 A, etc. PDU A (115A) and PDU B (115B) may have the same maximum current rating. Alternatively, PDU A (115A) and PDU B (115B) may have different maximum current ratings. Each PDU (115A, 115B) may receive queries regarding its maximum current rating and respond to the queries with its maximum current rating. Additionally or alternatively, each PDU (115A, 115B) may respond with its unique identifier (e.g., model number, serial number, etc.) from which its maximum current rating may be determined (e.g., through lookup tables, databases, web searches, etc.).

In one or more embodiments of the invention, PDU A (115A) has one or more fuses and/or one or more circuit breakers. If the current drawn on feed A (128A) is in excess of the maximum current rating for PDU A (115A), the fuses may blow and/or the circuit breakers may trip. Similarly, PDU B (115B) has one or more fuses and/or one or more circuit breakers. If the current drawn on feed B (128B) is in excess of the maximum current rating for PDU B (115B), the fuses may blow and/or the circuit breakers may trip. If the fuses blow and/or the circuit breakers trip in a PDU (115A, 115B), a human operator may be needed to reset the PDU (115A, 115B).

In one or more embodiments of the invention, the system (100) includes the network device (120). The network device (120) may be a multi-terabit packet-optical switching platform. Additionally or alternatively, the network device (120) may correspond to any optical or Ethernet network component. As shown in FIG. 1.1, the network device (120) includes multiple line modules (i.e., Line Module 1 (122A), Line Module 2 (122B), Line Module N (122N), etc.). Each line module (122A-122N) may correspond to a client interface, a line interface, etc. Additionally or alternatively, each line module may correspond to any component of the network device (120) that is powered by multiple feeds. The network device (120) may also have additional components not shown (e.g., cooling fans, switch fabric cards, etc.). As shown in FIG. 1.1, each line module (122A-122N) is powered by both feed A (128A) and feed B (128B). Although not shown in FIG. 1.1, the controller (124) and some other components (e.g., cooling fans, switch fabric cards, etc.) may also be powered by feed A (128A) and feed B (128B).

FIG. 1.2 shows line module N (122N) in accordance with one or more embodiments of the invention. Line module N (122N) is essentially the same as the other line modules (122A, 122B) in the network device (120). In other words, the components of line module N (122N) shown in FIG. 1.2 are representative of at least some of the components of the line modules shown in FIG. 1.1. As shown in FIG. 1.2, line module N (122N) includes a power module (180) connected to both feeds (128A, 128B) and multiple circuits (i.e., Circuit 1 (184A), Circuit 2 (184B), Circuit K (184K), etc.). The power module (180) may be an FPGA or an ASIC. Each circuit (184A-184K) may correspond to an FPGA or an ASIC and correspond to a port. Each circuit (184A-184K) may be independently powered down and/or powered on. In order to power the multiple circuits (184A-184K), the power module (180) may draw different amounts of current from the different feeds (e.g., 20 A vs. 40 A). This current sharing (i.e., drawing current from both feeds) may be implemented by diode ORing, active ORing, and/or any additional sharing mechanism.

In one or more embodiments, line module N (122N) can operate in multiple modes, and each mode requires a different amount of power. The mode requiring the most amount of power is the high power mode of the line module N (122N). In one or more embodiments of the invention, line module N (122N) has a power rating (e.g., 430 W, 620 W, etc.). The power rating reflects the line module's relatively constant power consumption in a high power mode and/or while operating in a high ambient temperature. In general (i.e., under normal operating conditions), line module N (122N) is consuming less power than its power rating. Line module N (122N) may receive queries regarding its power rating and respond to the queries with its power rating. Additionally or alternatively, line module N (122N) may respond with its unique identifier (e.g., model number, serial number, etc.) from which its power rating may be determined (e.g., through lookup tables, databases, web searches, etc.).

In one or more embodiments of the invention, the power module (180) stores both a current threshold (182) and a shutdown voltage (186). The current threshold (182) is a threshold corresponding to electrical current. The shutdown voltage (182) may correspond to the shutdown voltage discussed above in reference to the backup battery sets (108A, 108B). Additionally or alternatively, the shutdown voltage (186) may be approximately 2V (or more) less than the shutdown voltage discussed above in reference to the backup battery sets (108A, 108B). The drop in voltage may be due to the electrical properties of the feeds (128A, 128B) and the PDUs (115A, 115B) between the backup battery sets (108A, 108B) and the line modules (122A-122N). For example, the shutdown voltage (186) may be 38.5V.

In one or more embodiments of the invention, the power module (180) is configured to initiate a shutdown procedure if: (i) the current drawn from either feed satisfies (i.e., equals or exceeds) the current threshold (182); or (ii) the voltage on either feed equals or approximately equals the shutdown voltage (186). The concern with condition (i) is exceeding the maximum current rating of a PDU (discussed above and below), and thus blowing fuses and/or tripping breakers in the PDU. The concern with condition (ii) is damage to a set of backup batteries (discussed above).

Accordingly, in one or more embodiments of the invention, the power module (180) has the circuitry (e.g., ammeter circuitry) to monitor the drawn current from each feed (128A, 128B) and the voltage on each feed (128A, 128B). In one or more embodiments of the invention, the shutdown procedure immediately places line module N (122) in a different mode requiring less power. Additionally or alternatively, the shutdown procedure initially shuts down one of the circuits (184A-184K). If condition (i) or (ii) still remains true after one circuit is shutdown, another circuit (184A-184K) may be shutdown. This shutdown of individual circuits (184A-184K) may continue until neither condition (i) nor (ii) is true.

In one or more embodiments, the power module (180) receives queries regarding the measured currents and voltages. The power module (180) may respond to these queries with the power consumption data (i.e., measured currents and voltages). Additionally or alternatively, the power module (180) may periodically or randomly receive revised values for the current threshold (182) and the shutdown voltage (186).

Referring back to FIG. 1, in one or more embodiments, the network device (120) includes the controller (124). The controller may be implemented in software, hardware, or any combination of hardware and software. Although not shown in FIG. 1.1, the controller (124) may have a communication channel with each PDU (115A, 115B). The controller (124) may also have a communication channel with each line module (122A-122N). The communication channels may have wired and/or wireless segments.

In one or more embodiments of the invention, the controller (124) is configured to determine the maximum power rating of each PDU (115A, 115B) and the power rating of each line module (122A-122N). Specifically, the controller may query each PDU (115A, 115B) and each line module (122A-122N) for its maximum current rating and power rating, respectively.

In one or more embodiments of the invention, the controller (124) is configured to calculate the maximum aggregate current for the line modules (122A-122N). The maximum aggregate current is the sum of the maximum currents being drawn by the line modules (122A-122N) when: (a) each line module (122A-122N) is operating in high power mode and/or in a high ambient temperature; and (b) the voltage on the feed equals or approximately equals the shutdown voltage. Accordingly, the maximum aggregate current may be calculated from the power ratings for the line modules (122A-122N) and the shutdown voltage (e.g., shutdown voltage (186), discussed above in reference to FIG. 1.2).

For example, assume there are four line modules connected to the feeds and two of the line modules have a power rating of 620 W, and the other two of the line modules have a power rating of 430 W. Further, assume the shutdown voltage is 38.5V. The maximum aggregate current for the line modules is: (620 W÷38.5V)+(620 W÷38.5V)+(430 W÷38.5V)+(430 W÷38.5V)=54.54 A.

As another example, assume all four line modules have a power rating of 620 W, and the shutdown voltage is still 38.5V. The maximum aggregate current for the line modules is: (620 W÷38.5V)+(620 W÷38.5V)+(620 W÷38.5V)+(620 W÷38.5V)=64.41 A.

Those skilled in the art, having the benefit of this detailed description, will appreciate that DC power is a product of voltage and current. Accordingly, if power consumption is to remain constant, a decrease in voltage must be accompanied by an increase in current. Accordingly, the maximum current drawn by a line module for a power rating occurs when the voltage is at a minimum. As discussed above, the minimum voltage before the line module shuts down is the threshold voltage.

During normal operation of both DC power plants (104A, 104B) (i.e., the incoming AC signal (101) is available and the rectifiers (106A, 106B) are operational), both feeds (128A, 128B) are active and it is highly unlikely that the maximum aggregate current would be drawn by the line modules (122A-122N), especially from a single feed (128A, 128B). Accordingly, even though the PDUs have a maximum current rating (e.g., 60 A), it is still feasible to operate line modules with a maximum aggregate current that exceeds the maximum current rating.

However, a worst case scenario exists when: only one of the feeds (128A, 128B) is active, the line modules (122A-122N) connected to the one active feed are in high power modes and/or are operating in a high ambient temperature, the DC power plant powering the one active feed is relying on a backup battery set (e.g., there has been a failure of the incoming AC signal (101)), and the voltage on the backup battery set is towards the end of its reserve time and approaching the shutdown voltage. In this worst case scenario, the maximum aggregate current may be drawn from the one active feed. If the maximum aggregate current exceeds the maximum current rating (e.g., 64.41 A>60 A), a high likelihood of blowing fuses and/or tripping circuit breakers in the PDU connected to the active feed exists. This is undesirable because a human operator is needed at the location to reset the system (100) once the failed incoming AC power signal is restored and/or another source (e.g., diesel generator) provides power. If no fuses are blown and no circuit breakers are tripped, the system (100) may be restarted (e.g., when the failed incoming AC power signal is restored) without a human operator at the location of the system (100).

In one or more embodiments of the invention, the controller (124) allocates a current threshold (e.g., current threshold (182), discussed above in reference to FIG. 1.2) to each of the line modules (122A-122N). As discussed above, the current thresholds are thresholds corresponding to electrical currents. The current thresholds are allocated to prevent the maximum aggregate current from being drawn during the worst case scenario, and thus prevent blowing fuses and/or tripping circuit breakers in the PDUs. Even though the current thresholds are used to shut down one or more line modules during the worst case scenario, this is a small loss in reliability because the worst case scenario is unlikely to occur in the first place.

There are multiple ways to allocate current thresholds. For example, the maximum current rating (minus power consumed by other components powered by the feeds (128A, 128B), if any) may be divided equally among the line modules (122A-122N). In other words, the maximum current rating (minus power consumed by other component powered by the feeds (128A, 128B)) is divided by the cardinality of the lines modules (i.e., the number of line modules). This results in each line module (122A-122N) being given the same current threshold, and the sum of the current thresholds is less than or equal to the maximum current rating.

As another example, a ratio of the maximum current rating (minus power consumed by other components powered by the feeds (128A, 128B), if any) to the maximum aggregate current is calculated. Then, the current threshold for a line module is the maximum current for the line module (i.e., power rating for the line module divided by shutdown voltage) multiplied by the ratio. In other words, the current threshold for a line module is the product of the ratio and the maximum current for the line module.

As yet another example, different line modules (122A-122N) may have different priorities. The current threshold for a line module having a high priority may be set to the maximum current for the line module (i.e., power rating for the line module divided by shutdown voltage). The current threshold for line modules with lower priorities may be based on whatever current remains to be allocated (i.e., maximum current rating minus current thresholds already allocated to high priority line modules).

In one or more embodiments, the controller (124) may receive power consumption data (i.e., measured currents, measured voltages, etc.) from the multiple line modules (122A-122N). The controller (124) may calculate and send out revised current thresholds to the line modules (122A-122N) based on the power consumption data. For example, a line module drawing a larger than expected current may be allocated a revised current threshold that is lower than the line module's existing current threshold.

Although FIG. 1.1 only shows two feeds (128A, 128B) powering network device (120), in other embodiments additional feeds are also powering network device (120). In other words, different sets of feeds may power different line modules within with network device (120). Further, in other embodiments of the invention, the network device (120) may have multiple controllers, with different controllers responsible for different sets of line modules.

FIG. 2 shows a flowchart in accordance with one or more embodiments of the invention. The flowchart depicts a process for power management. One or more of the steps in FIG. 2 may be performed by the components of the system (100) (e.g., controller (124)), discussed above in reference to FIG. 1.1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, a maximum current rating for a PDU is determined (STEP 205). The maximum current rating for the PDU may be determined by a controller of a network device. Specifically, the controller may query the PDU for its maximum current rating (e.g., 60 A). The PDU and the network device may be arranged as shown in FIG. 1. In other words, the PDU is driven by a DC power plant and provides a feed to power multiple line modules in the network device.

In STEP 210, the power ratings for the line modules in the network device are determined. The power ratings for the line modules may be determined by the controller of the network device. Specifically, the controller may query each line module for its power rating. The power rating reflects the line module's relatively constant power consumption in a high power mode and/or while operating in a high ambient temperature. Different line modules may have different power ratings (e.g., 430 W, 620 W, etc.).

In STEP 215, the maximum aggregate current for the line modules is calculated. The maximum aggregate current is the sum of the maximum currents drawn by each line modules. As discussed above, the maximum current drawn by a line module may be calculated by dividing the power rating for the line module with the shutdown voltage (e.g., 38.5V) corresponding to a backup battery set that drives the PDU.

In STEP 217, it is determined (e.g., by the controller of the network device) whether the maximum aggregate current exceeds the maximum current rating. If the maximum aggregate current exceeds the maximum current rating, it is likely that the fuses in the PDU will be blown and/or the circuit breakers will be tripped in the worst case scenario discussed above. However, if the maximum aggregate current does not exceed the maximum current rating, it is unlikely that the fuses in the PDU will be blown and/or the circuit breakers will be tripped, even in the worst case scenario. Accordingly, when it is determined that the maximum aggregate current exceeds the maximum current rating, the process proceeds to STEP 220.

In STEP 220, current thresholds are allocated to the line modules. Allocating the current thresholds may include both calculating the current thresholds and sending the current thresholds to the line modules. Each line module stores the current threshold it received from the controller. Each line module compares the current being drawn, from either feed, with its allocated current threshold. If the current being drawn satisfies (i.e., equals or exceeds) the current threshold, the line module initiates a shutdown procedure. When some or all line modules follow this protocol, it is unlikely that the maximum aggregate current will be drawn from a single feed, and thus it is unlikely that fuses will blow and/or circuit breakers will trip during the above-mentioned worst case scenario.

As discussed above, there are multiple ways to allocate the current thresholds to the multiple line modules. For example, all line modules may be given the same current threshold and the sum of all the current thresholds is equal to or less than the maximum current rating. As another example, line modules with higher priorities may be allocated higher current thresholds than line modules with lower priorities.

In one or more embodiments of the invention, the controller may receive power consumption data (i.e., measured currents and voltages) from each line modules. Based on this power consumption data, the controller may revised the current thresholds and send the revised current thresholds to the line modules.

In one or more embodiments, if the maximum aggregate current is less than the maximum current rating (i.e., STEP 217 is false), there might be no need to allocate current thresholds.

Figure 3:
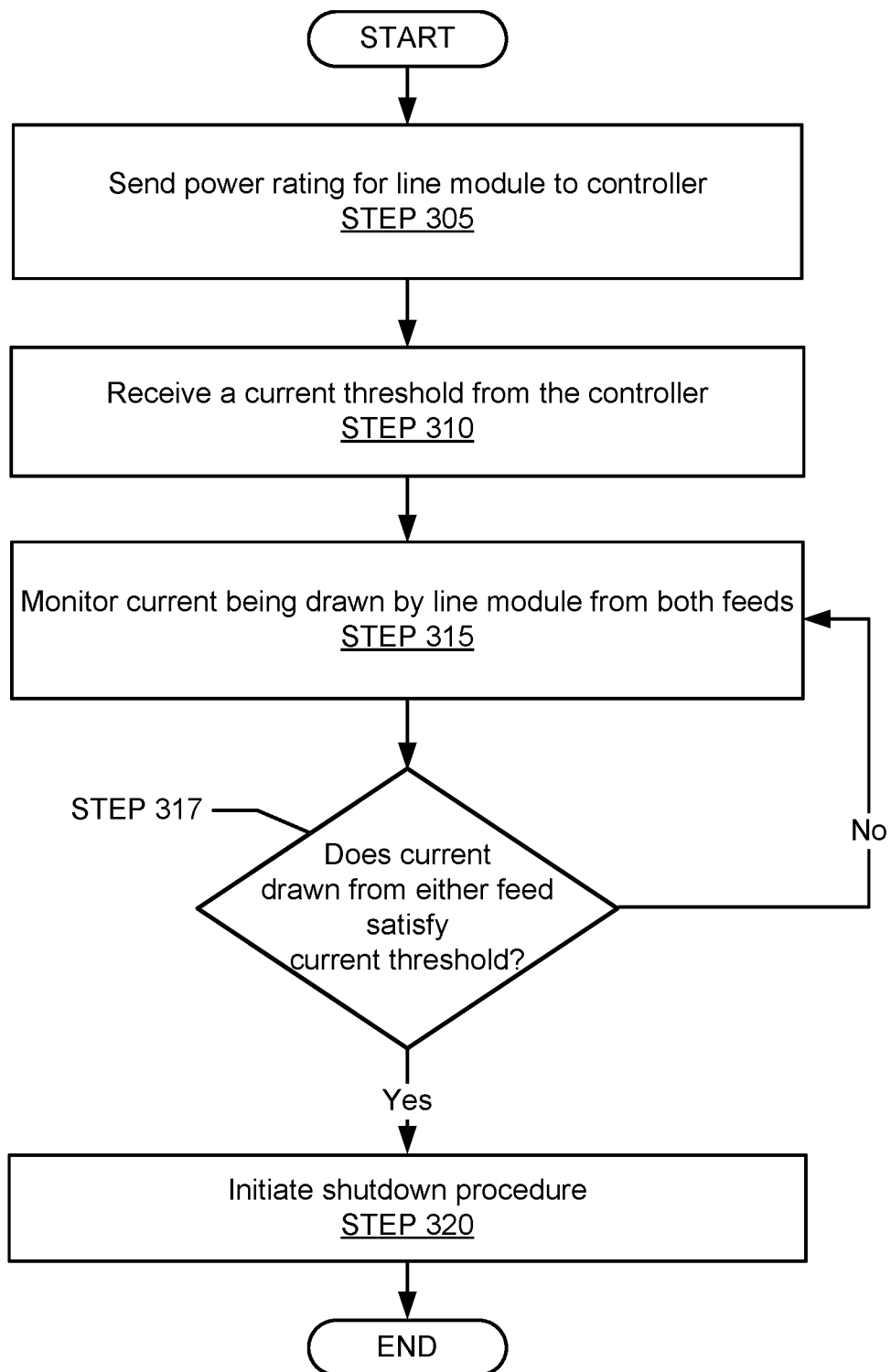

FIG. 3 shows a flowchart in accordance with one or more embodiments of the invention. The flowchart depicts a process for power management. One or more of the steps in FIG. 3 may be performed by the components of the system (100) (e.g., line module N (122N)), discussed above in reference to FIG. 1.1 and FIG. 1.2. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3. One or more steps in FIG. 3 may be executed before or after one or more steps in FIG. 2.

Initially, a power rating for the line module is sent to the controller (STEP 305). The power rating may be sent by the power module in the line module and in response to a query from the controller. The power rating reflects the line module's relatively constant power consumption in a high power mode and/or while operating in a high ambient temperature. In one or more embodiments, the line module is being powered by dual feeds, as shown in FIG. 1.1 and FIG. 1.2. The line module may implement diode ORing to share/draw current from the dual feeds to power the circuits (e.g., ASICs, FPGAs, etc.) corresponding to the ports of the line module.

In STEP 310, a current threshold is received from the controller. The current threshold may be stored in the power module of the line module. In STEP 315, the power module monitors current being drawn by the line module from either feed. Accordingly, the power module includes the necessary circuitry to measure the current being drawn from either feed. The power module also monitors the voltage on each feed. This power consumption data (i.e., measured currents and voltages) may be transmitted to the controller.

In STEP 317, it is determined whether the current being drawn from either feed satisfies (i.e., equals or exceeds) the current threshold. When the current being drawn satisfies the current threshold, the process may proceed to STEP 320. When the current being drawn does not satisfy the current threshold, the process may return to STEP 315 to continue monitoring the current being drawn.

In STEP 320, the power module may initiate a shutdown procedure in response to the current being drawn satisfying the current threshold. The shutdown procedure may also be initiated in response to the measured voltage on a feed equaling or approximately equaling the shutdown voltage (discussed above but not shown in FIG. 3). The shutdown procedure may place the line module in a low power mode. Additionally or alternatively, the shutdown procedure may initially shutdown a circuit in the line module corresponding to a port, but leave the remaining circuits corresponding to ports operational. If the condition in STEP 317 remains true after the circuit is shutdown, another circuit corresponding to another port is shutdown. This may be repeated until the condition in STEP 317 is no longer true.

Those skilled in the art, having the benefit of this detailed description, will appreciate that when all line modules follow the process depicted in FIG. 3, especially the shutdown procedure, it is unlikely that the maximum aggregate current will be drawn from a single feed, and thus it is unlikely that fuses will blow and/or circuit breakers will trip during the above-mentioned worst case scenario.

Consider the following example. Assume a system similar to system (100) exists. In other words, there is a network device with four line modules (LM1, LM2, LM3, LM4). Dual feeds are powering the four line modules. The PDU of each feed has a maximum current rating of 60V. Each PDU is driven by a DC power plant with a set of backup batteries, and there is a shutdown voltage of 40V corresponding to the set of backup batteries.

In this example, LM1 has a power rating of 600 W. LM2 has a power rating of 650 W. LM3 has a power rating of 800 W. LM4 has the same power rating as LM1 (i.e., 600 W).

The maximum aggregate current is the sum of the maximum current of each line module. The maximum current of a line module is the power rating of the line module divided by the shutdown voltage. Accordingly, the maximum current of LM1=600 W/40V. The maximum current of LM2=650 W/40V. The maximum current of LM3=800 W/40V. The maximum current of LM4=maximum current of LM1=600 W/40V.

Maximum Aggregate Current=maximum current of LM1+maximum current of LM2+maximum current of LM3+maximum current of LM4=1600 W/40V+650 W/40V+800 W/40V+600 W/40V=66.25 A.

66.25 A exceeds the maximum current rating of 60 A. Under normal operating conditions, it is unlikely that the maximum aggregate current will be drawn by the line modules, especially from a single feed. In other words, under normal operating conditions, it is unlikely that the fuses in one of the PDUs will blow and/or the circuit breakers in the PDU will trip. Accordingly, even though the PDU has a maximum current rating of 60 A, it is still feasible to operate line modules with a maximum aggregate current that exceeds the maximum current rating.

However, under the worst case scenario discussed above, it is possible for the line modules to drawn the maximum aggregate current (i.e., 66.25 A) from a single feed. As 66.25 A exceeds the maximum current rating of 60 A, it is likely the fuses of the PDU would blow and/or the circuit breaker would trip. To avoid this scenario, it is necessary to allocate current thresholds to the line modules.

In this example, the current thresholds are calculated by first calculating a ratio of the maximum current rating to the maximum aggregate current (i.e., ratio=60 A/66.25 A=0.906). It is assumed for this example that there are no other components except the four line modules that are powered by the dual feeds. Then, the current threshold for each line module is calculated by multiplying the ratio with the maximum current for the line module (i.e., power rating divided by the shutdown voltage).

Current Threshold for LM1=ratio×LM1 maximum current=0.906×600 W/40V=13.6 A.

Current Threshold for LM2=ratio×LM2 maximum current=0.906×650 W/40V=14.7 A.

Current Threshold for LM3=ratio×LM3 maximum current=0.906×800 W/40V=18.1 A.

Current Threshold for LM4=ratio×LM4 maximum current=0.906×600 W/40V=13.6 A.

These current thresholds are sent to the respective line modules. The line modules monitor the currents being drawn from either feed. For a given line module, if the current drawn from either feed satisfies (i.e., equals or exceeds) the current threshold for the line module, the line module initiates a shutdown procedure. If all line modules follow this protocol, the maximum aggregate current will not be drawn during the worst case scenario. In fact, the maximum current drawn by the line modules will equal or approximately equal the maximum current rating of 60 A.

Accordingly, there is no need to design/install a power distribution system with a higher maximum current rating because of the four line modules. Instead, the existing, already installed power distribution system can be used and the four line modules can shut down during the (very rare) worst case scenario, using the current thresholds as triggers to initiate the shutdown procedure.

Various embodiments of the invention may have one or more of the following advantages: the ability to prevent fuses from blowing and/or circuit breakers from tripping during a worst case scenario involving a single feed; the ability to restart a system following a power failure without a human operator because no fuses are blown and no breakers are tripped; the ability to use an existing and already installed power distribution system with a maximum power rating to power multiple line modules having a maximum aggregate current in excess of the maximum power rating; the ability to allocate a current threshold to a line module such that the line module initiate a shutdown procedure if current drawn from a feed satisfies the current threshold; the ability to initiate a shutdown procedure to protect a backup battery set; etc.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A line module for use in a network device, the line module comprising:
   a plurality of circuits; and
   a power module comprising at least one circuit, wherein the power module is connected to the plurality of circuits and a Power Distribution Unit (PDU), and the at least one circuit of the power module is configured to, when a current drawn from a power feed connected to the PDU exceeds a current threshold, shut down one or more of the plurality of circuits until the current threshold is no longer exceeded, wherein the at least one circuit of the power module is configured to respond to queries regarding measured current and voltage.

2. The line module of claim 1, wherein the power module includes circuitry configured to monitor drawn current and voltage on the power feed.

3. The line module of claim 1, wherein each of the plurality of circuits includes one or more of a Field Programmable Gate Array (FPGA) and an Application Specific Integrated Circuit (ASIC), and wherein each of the plurality of circuits is individually powered up and powered down.

4. The line module of claim 1, wherein the line module is configured to operate in multiple modes, and each mode requires a different amount of power, and wherein the at least one circuit of the power module is further configured to, when the current drawn from the power feed connected to the PDU exceeds the current threshold, place the line module in a different mode requiring less power.

5. The line module of claim 1, wherein the line module is communicatively coupled to a controller associated with the network device, and wherein the controller includes at least one circuit configured to determine the current threshold.

6. The line module of claim 5, wherein the at least one circuit in the controller is configured to determine the current threshold based on a number of line modules in the network device and based on operating conditions.

7. The line module of claim 1, wherein, to shut down the one or more of the plurality of circuits, the at least one circuit of the power module is configured to shut down the one or more of the plurality of circuits when voltage on the power feed approximately equals a shutdown voltage, wherein the shutdown voltage is set based on backup batteries associated with the PDU.

8. A network device comprising:
   a controller implemented in hardware; and
   a plurality of line modules communicatively coupled to the controller, wherein each of the plurality of line modules includes a plurality of circuits and a power module comprising at least one circuit, wherein for each line module:
   the power module is connected to the plurality of circuits and to a Power Distribution Unit (PDU), the at least one circuit of the power module is configured to, when a current drawn from a power feed connected to the PDU exceeds a current threshold, shut down one or more of the plurality of circuits until the current threshold is no longer exceeded,
wherein the current threshold is based on a current rating of the PDU to avoid blowing fuses or tripping breakers.

9. The network device of claim 8, wherein the at least one circuit of the power module is configured to monitor drawn current and voltage on the power feed.

10. The network device of claim 8, wherein each line module is configured to operate in multiple modes, and each mode requires a different amount of power, and wherein the at least one circuit of the power module is further configured to, when the current drawn from the power feed connected to the PDU exceeds the current threshold, place the line module in a different mode requiring less power.

11. The network device of claim 8, wherein the at least one circuit of the power module is configured to respond to queries regarding measured current and voltage.

12. The network device of claim 8, wherein at least one circuit in the controller is configured to determine a respective current threshold for each of the plurality of line modules.

13. The network device of claim 8, wherein at least one circuit in the controller is configured to receive power consumption data f rom the plurality of line modules to determine a respective current threshold for each of the plurality of line modules.

14. The network device of claim 13, wherein at least one circuit in the controller is configured to:
update the respective current threshold for each of the plurality of line modules based on the received power consumption data; and
send the updated respective current threshold for each of the plurality of line modules.

15. The network device of claim 8, wherein the plurality of line modules comprises lower priority line modules and a higher priority line module.

16. The network device of claim 15, wherein a current threshold of a lower priority line module of the lower priority line modules is based on a difference between a combined maximum current threshold of the plurality of line modules and a current threshold of the higher priority line module.

17. The network device of claim 8, wherein the at least one circuit of the power module is further configured to individually control power supply to each of the plurality of circuits.

18. A line module for use in a network device, the line module comprising:
a plurality of circuits; and
a power module comprising at least one circuit, the power module being connected to the plurality of circuits, and to a Power Distribution Unit (PDU), wherein
the at least one circuit of the power module is configured to, when a current drawn from a power feed connected to the PDU exceeds a current threshold, shut down one or more of the plurality of circuits until the current threshold is no longer exceeded, and
the line module is communicatively coupled to a controller, including at least one circuit, associated with the network device, and wherein the at least one circuit in the controller is configured to determine the current threshold, wherein the at least one circuit of the power module is configured to respond to queries regarding measured current and voltage.

* * * * *